United States Patent [19]
Hachtel et al.

[11] Patent Number: 5,126,665
[45] Date of Patent: Jun. 30, 1992

[54] DEVICE FOR MEASURING AN ANGLE OF ROTATION OF A ROTATABLE STRUCTURAL ELEMENT

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

[21] Appl. No.: 623,918

[22] PCT Filed: Jul. 11, 1989

[86] PCT No.: PCT/DE89/00455
  § 371 Date: Dec. 10, 1990
  § 102(e) Date: Dec. 10, 1990

[87] PCT Pub. No.: WO90/01145
  PCT Pub. Date: Feb. 8, 1990

[30] Foreign Application Priority Data

Jul. 20, 1988 [DE] Fed. Rep. of Germany ....... 3824535

[51] Int. Cl.⁵ .................. G01B 7/30; G01B 7/14
[52] U.S. Cl. .................. 324/207.19; 304/207.22; 304/207.25
[58] Field of Search ........... 324/164, 173, 174, 207.15, 324/207.16, 207.17, 207.18, 207.19, 207.25; 310/168; 340/870.31; 336/45, 130, 134, 135

[56] References Cited

U.S. PATENT DOCUMENTS

| | | | |
|---|---|---|---|
| 2,949,576 | 8/1960 | Bolton | 340/870.31 |
| 3,020,527 | 2/1962 | MacLaren | 324/207.17 X |
| 3,439,256 | 4/1969 | Kahne | 324/207.17 X |
| 4,013,911 | 3/1977 | Fujiwara et al. | 324/207.17 X |
| 4,764,767 | 8/1988 | Ichikawa et al. | 340/870.31 |
| 5,027,067 | 6/1991 | Witzig et al. | 324/164 X |

FOREIGN PATENT DOCUMENTS 2132358 7/1984 United Kingdom ............... 324/204

*Primary Examiner*—Gerard R. Strecker
*Attorney, Agent, or Firm*—Michael J. Striker

[57] ABSTRACT

A device for measuring an angle of rotation has a central longitudinal groove (12) extending in a coil body (11) from the front end surface thereof so that two cores (13, 14) having a semicircular cross-sections are formedd. A coil (15, 16) is wound on each of these cores (13, 14) in the circumferential direction, which coils (15, 16) are in a working connection with a measuring part (17) having areas of electrically conducting and/or ferromagnetic material. The measuring part (17) is constructed as a sleeve segment and overlaps half of the circumference of the coil body (11) as seen in the circumferential direction. Measurement errors are eliminated to a great extent by connection and arrangement of the coils (15, 16) relative to one another.

7 Claims, 1 Drawing Sheet

DEVICE FOR MEASURING AN ANGLE OF ROTATION OF A ROTATABLE STRUCTURAL ELEMENT

BACKGROUND OF THE INVENTION

The invention relates to a device for measuring the angle of rotation and including two bodies having areas of electrically conductive and/or ferromagnetic material, and sensor coils whose resistance changes as a function of change in the magnitude of area of one of the bodies assigned to sensor coils. In a known measuring device the rotation of a shaft is determined by two concentrically arranged sleeves which are moved relative to one another. One of the sleeves comprises two rows of slots which are offset relative to one another and form the electrically nonconductive area. In the other sleeve, a row of continuous slots is formed which likewise extend in the direction of the sleeve axis. At least one coil, through which a high-frequency alternating current flows, is arranged in the area of the two slot rows of the first sleeve. The electrically nonconductive surface of the sleeves, i.e. the opening surface of the slots, is changed by relative tangential displacement of the two sleeves relative to one another, so that the damping of the coils is varied. The measuring device has the disadvantage that only small angles of rotation are measurable.

SUMMARY OF THE INVENTION

The object of the invention in a measuring device, having a relatively small size and able to measure angles of up to 180°. The object of the invention is achieved by dividing one body into a number of areas corresponding to the number of coils with a coil arranged on each area and by location the second body in a recess of the one body. Because of the semicircular construction of the coil body, the diameter of the sensor can be small. The coil body is constructed with consideration to manufacturing. so that the coil can be wound relatively simply, and a simple overall assembly of the sensor is possible. Coils with an overall width of 1 to 2 mm already deliver a relatively high measurement signal. The measurement errors caused by the axial play of the coil body and the measurement part do not occur or are only negligibly small. Since the coils are comprised in a compensating circuit, the temperature-dependent transmitteroffset drift is low.

The present invention both as to its construction so to its method of operation, together with additional objects and advantages thereof, will be best understood from the following detailed description of the preferred embodiments when read with reference the accompanying drawings.

BRIEF DESCRIPTION OF THE DRAWINGS

FIG. 5 shows an electrical circuit of the device.

DESCRIPTION OF THE PREFERRED EMBODIMENTS

Figure 1:
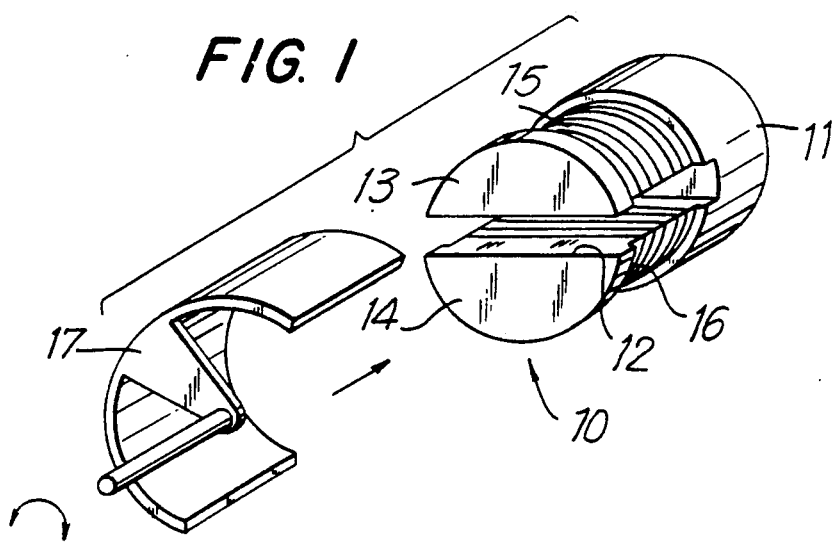
FIG. 1 shows an exploded view of the measuring device according to the invention.

A sensor comprising a cylindrical coil body 11 is designated by 10 in FIG. 1. The latter is produced from a solid cylinder of material which is preferably electrically nonconductive. The cylinder has a central longitudinal groove 12 proceeding from a front end surface. Two cores 13, 14 which are semicircular in cross-section are accordingly formed, a coil 15, 16 being wound on each of the cores. They are connected in a Wheatstone bridge as shown in FIG. 5. The coils 15, 16 are wound in the circumferential direction of the coil body 11. A measuring part 17 comprising metallic, electrically conductor and/or ferromagnetic material is arranged at a slight distance around the coil body 11 and is constructed as a sleeve segment and overlaps half of the circumference of the coil body as seen approximately in the circumferential direction. The length of the measuring part 17 should preferably be equal at least to the width of the coils 15 and 16, respectively. The measuring part 17 is connectable with a structural component part, not shown, whose rotational movement is to be determined.

In the initial position, the measuring part 17 is aligned in such a way that two surface areas of the measuring part overlap the two coils 15 and 16, respectively. The sensor 10 can work according to the inductive or eddy current measuring principle. With the eddy current measuring principle, a high-frequency alternating current flows through the coils 15, 16. The measuring part 17 is rotated around the coil body 11 for the purpose of measurement. A magnetic alternating field is formed at the coils 15, 16 which causes eddy currents on the metallic surface of the measuring part 17. The greater the surface of the measuring part 17 penetrated by the magnetic field, the more eddy currents are produced. Further, the magnitude of the generated eddy currents depends on the material utilized for the measuring part 17, particularly its surface, as well as on the distance of the coils 15 and 16, respectively, from the surfaces of the measuring part 17. The alternating current resistance of the coils is reduced by the generated eddy currents, which is utilized for obtaining the measurement signal. During the rotational movement of the measuring part 17, the magnitude of the surface areas of measuring part 17 assigned to the respective coils 15 and 16, respectively, is changed. The surface of the measuring part 17 assigned to the coil 15 is accordingly increased by the same amount as the surface assigned to coil 16 is reduced. The two coils 15, 16 are connected in a Wheatstone half-bridge circuit. Accordingly, the measurement errors occurring simultaneously and acting in the same direction in the coils 15, 16 are compensated for. If the width of the coils 15, 16 is greater or smaller than the width of the measuring part 17, an axial play caused by the installation does not result in practice, or only to a very slight extent, as an error in the measurement signal.

Of course, it is also possible to use e.g. four or more coils instead of two, so that smaller measurement angles can be determined. For this purpose a second longitudinal groove is to be constructed in the coil body perpendicular to the longitudinal groove 12, so that four segments are formed on which a coil can be wound in each instance. These four coils are connected in a Wheatstone bridge circuit. The measuring part should then preferably be constructed in such a way that half of each coil is overlapped in the initial position.

If the number of coils is to be further increased, the number of longitudinal grooves is to be increased accordingly, so that e.g. a star-shaped arrangement of the longitudinal grooves is formed. The measuring part 17 can execute a rotational movement of 360°. However, the actual measuring area is approximately limited to the tangential length of the coils and keeps repeating in the form of a delta voltage depending on the number of coils.

Figure 2:
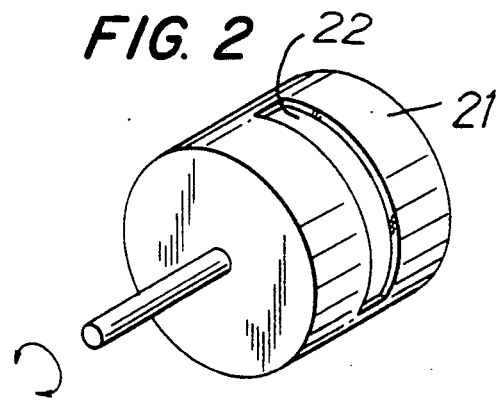
FIG. 2 shows a perspective view of the measuring part.

In the embodiment example according to FIG. 2, the measuring part is constructed as a pot-shaped body 21 with a window 22 in the side wall. As seen in the circumferential direction, the window 22 is long enough so that it comprises half of the circumference of the coil body 11. The manner of operation corresponds to that of the embodiment according to FIG. 1. The pot-shaped measuring part 21 can be constructed in such a way that its inner diameter forms a clearance with the outer diameter of the coil body 11 such that the parts rotate easily relative to one another. At the same time, however, the radial play must be restricted in such a way that radial errors exert only a negligibly small influence on the measurements. A precondition for this is that the diameter of the semicircular coils 15, 16 is smaller than the diameter of the coil carrier 11. The advantage of this variant is the very simple construction and assembly of such sensors, since the measuring part 21 slides on the coil carrier 11 (sliding bearing principle).

It is also possible in the construction according to FIG. 2 to produce the body 21 from nonconducting material and to provide an area of electrically conducting material instead of the window 22. The advantages of the sliding bearing can accordingly be combined with the measuring device according to FIG. 1 in a particularly favorable manner.

Figure 4:
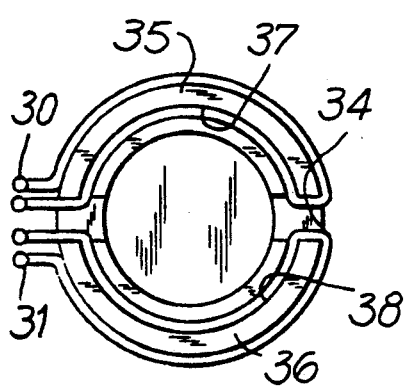
FIG. 4 shows a side view in the direction IV—IV according to FIG. 3.
Figure 3:
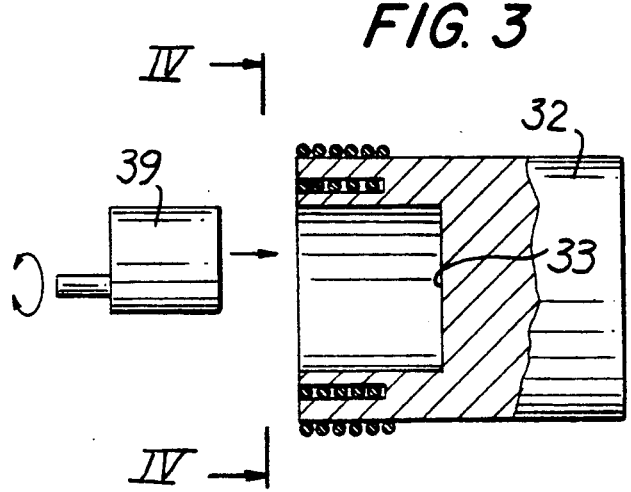
FIG. 3 shows a cross-sectional view of another embodiment of the measuring device according to the invention.

The embodiment shown in FIG. 3 and 4 is the reverse of that according to FIG. 1. In this instance, the coils 30, 31 are arranged on an outer body 32. The body 32 comprises a central recess 33 proceeding from the front end surface. Further, a central longitudinal groove 34 is constructed from the front end surface so that two cores 35, 36 are formed which are arc-shaped in cross-section, a coil 30, 31 being wound on the cores 36, 36 in each instance. For this purpose, a groove 37, 38 is constructed in each core 35, 36 in which the coils 30, 31 are arranged. The measuring part 39 can correspond to the measuring part 17. The manner of operation again corresponds to that of the embodiment according to FIG. 1; a difference is that the measuring part 38 moves within the body 32.

While the invention has been illustrated and described as embodied in a device for measuring an angle of rotation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

We claim:

1. A device for measuring an angle of rotation of a rotatable structural element, comprising a first substantially cylindrical body having a longitudinal axis and subdivided into a plurality of geometrically alike component parts spaced from one another in a radial direction; at least one coil arranged on each of said components parts and supplied with alternating current, axes of the coils and of said component parts extending parallel to said axis of said first body; a second body surrounding said first body and rotatable relative to said first body and having an inner surface corresponding to an outer cylindrical surface of said first body, said second body having at least one region of at least one of an electrically conductive material and a ferromagnetic material which one region at least partially overlaps an associated outer surface of a respective coil of a respective component part of said first body so that during rotation of said second body relative to said first body alternating current resistance of said coils is changed in dependence on a magnitude of the overlap which corresponds to the angle of rotation.

2. A device as set forth in claim 1, wherein the coils are wound around respective component parts.

3. A device as set forth in claim 1, wherein said first body is a solid cylinder having a groove extending in an axial direction and separating said component parts.

4. A device as set forth in claim 1, wherein said second body comprises a tubular member having a window.

5. A device as set forth in claim 4, wherein said second body consists of electrically non-conductive material with electrically conductive material in said window.

6. A device as set forth in claim 1, wherein said second body comprises a half-shell.

7. A device as set forth in claim 1, wherein the coils are connected in a Wheatstone bridge circuit.

* * * * *